United States Patent [19]
Wittrock

[11] 3,782,700
[45] Jan. 1, 1974

[54] PLASTIC MIXERS

[76] Inventor: Ludwig Wittrock, Breddenkampstrasse 121, 4370 Marl, Germany

[22] Filed: Sept. 5, 1972

[21] Appl. No.: 286,048

[30] Foreign Application Priority Data
Sept. 2, 1971 Germany.............. P 21 43 923.6

[52] U.S. Cl.................................. 259/192, 259/6
[51] Int. Cl............................................. B29f 3/02
[58] Field of Search....................... 259/192, 191, 6, 259/7, 5, 185, 194, 195

[56] References Cited
UNITED STATES PATENTS
3,314,660   4/1967   Arbiter .................................. 259/5
3,407,438   10/1968  Selbach............................... 259/192

Primary Examiner—William I. Price
Attorney—Norman S. Blodgett

[57] ABSTRACT

Apparatus for treating thermoplastic raw material, comprising means feeding material to be processed to a plasticizing means wherein the material is plasticized using frictional heat evolved by kneading the material, and means withdrawing and compressing the plasticized material. The temperature of the material being plasticized is controlled by regulating the pressure in the material by varying the rate at which material is fed to or withdrawn from the plasticizing means. The feeding and compressing is effected with minimum friction.

9 Claims, 2 Drawing Figures

PLASTIC MIXERS

BACKGROUND OF THE INVENTION

The present invention relates to improvements in a method of and apparatus for forming thermoplastic raw materials. The invention is applicable to the production of high-grade finished products or intermediate products from thermoplastic raw materials and similar materials. It is particularly concerned with raw materials produced by polymerization processes, such as polyvinyl chloride and polyethyline. These materials are available to the processor in pulverulent, particulate or granulate form. The processes are carried out not only with ordinary, but also with relatively high specific processing quantities per unit of time and machine.

The invention makes use of and improves the known method of plasticizing such raw materials by pressure and heat and by means of rotating tools in a kneading process in which the plastic flowable material is compressed so that it can flow through or fill molding tools, and can also be processed on other processing machines, such as sheeting calenders.

The material is heated in these conditions predominantly by frictional work via the roller and kneading tools. The known methods are carried out in conventional apparatus of diverse kinds, such as calenders and extruders which are used for batch or continuous operation.

Attempts have been made to improve the performance of the known processes and known apparatus so as to enable higher specific processing quantities to be used per unit of time and machine in order to reduce the cost of the plastics article and to make plastics economically advantageous even for large articles. Such attempts have been obstructed by the fact that the known processing steps are not sufficient to satisfy the physical processing conditions for qualitatively perfect products once a given specific throughput volume has been reached in the machine in use. The specific throughput volume attainable in practice at the present time differs greatly from that theoretically possible. For example, according to thermodynamic laws, a PVC powder granulate of a diameter of 0.1 mm is fully plasticized in about 0.3 seconds if it is subjected to a temperature of 165° from every direction. It therefore follows that in one hour 3600/0.3 = 12000 litres of PVC powder per litre of operative machine volume could be plasticized if each powder particle were exposed to the appropriate heat absorption.

If a modern processing machine (for example a planetary roller extruder having a plasticizing housing inside diameter of 200 mm and a length of 500 mm) has an available total internal volume of 16 litres and has an operative free volume of 4 litres (deducting the volume of the kneading elements, e.g., sun shaft and planetary rollers), and processes a throughput of 1000 litres per hour, its specific throughput volume referred to the total internal volume is 1000/16 = 63 litres/litre machine, while with respect to the operative internal volume it is 1000/4 = 250 litres per litre machine.

The plasticizing efficiency of the machine volume with respect to the total internal volume is thus 0.4 percent and with respect to the operative internal volume is 1.5 percent. The efficiency of the machine in respect of drive and plasticizing performance is logically much higher and will be disregarded here.

The low volumetric efficiency of the machine cited in the example, and other machines, is due:

1. to the difficulty of uniformly heating large quantities of plastics, and
2. to limitation of the speeds of flow of the material in the passages of the apparatus in order to obviate inadequate heating of the material due to wall frictional effects.

To make the volume of plastics material more receptive to heat while keeping the layers of material thin, requires that narrow flow passages and high plasticizing and conveying pressures be used.

To reduce the flow pressure in the plasticizing section in order to reduce the wall frictional effects, it is common practice to feed the plasticized material to a separately-driven compression section in which it is first brought to the required nozzle pressure with an enlarged flow cross-section and at a reduced speed of flow. The specific volume plasticizing efficiency is improved only moderately in these conditions, however. Nor are there any appreciable advantages to be derived from using fixed or variable throttle points (gap or nozzle adjustment) to induce a more favorable material pressure in the plasticizing section.

It is, therefore, an object of the invention to improve specific volume plasticizing efficiency.

According to one aspect of the present invention, there is provided an apparatus for forming thermoplastic raw material, comprising the steps of operating feeding means to feed material to be processed to a plasticizing means, plasticizing the material therein by utilizing frictional heat evolved by kneading the material, withdrawing and compressing the plasticized material by operating a compressing means, monitoring the temperature of the material in said plasticizing means and controlling the temperature by regulating the pressure in the material in said plasticizing means by varying the speed at which material is conveyed between said plasticizing means and at least one of the said feeding means and said compressing means, wherein said feeding and conveying means are operated with low friction.

According to another aspect of the present invention, there is provided apparatus comprising feeding means for feeding material to be processed, plasticizing means adapted to be supplied with material by the feeding means and to utilize frictional work to plasticize material fed thereto and compressing means for withdrawing and compressing material from said plasticizing means, wherein said feeding means, said plasticizing means and said compressing means are independently controllable and said feeding and compressing means are adapted to be operable with low friction.

In the preferred embodiment the feeding and compressing means are designed and dimensioned so that at maximum throughput there are only insignificant frictional losses and there is no appreciable change in the material consistency due to the influence of heat. Theoretically, 0.01 kW/kg of material are necessary at 100 atmospheres gauge for the conveyance and pressure build-up of plastics materials, while the theoretical average value for complete plasticization of plastics materials is 0.1 kW/kg.

The preferred plasticizing section is so designed that it provides the major part of the supplied energy (0.09 kW/kg) by means of kneading tools over a short distance of travel of the material being plasticized.

Since only conveying and pressure build-up occur in the feeding and the compressing means, the conveying cross-sections may be of any desired size, i.e., they may be designed for flow capacity of any value. The passage cross-section of the plasticizing section and its operative length may be so selected that the energy provided by the drive is utilized substantially totally for the plasticizing work. Tests have shown that a volume plasticizing efficiency of almost the same value as the plasticizing efficiency, e.g., 90 percent can be obtained.

The high plasticizing efficiency attainable in the apparatus of the invention should, however, be regarded only as secondary to operating costs. It is much more important that the throughput limitation formerly encountered in high-quality production has been eliminatd.

The feeding means and the compressing means may each be a feed screw, preferably a multiple screw pump, which is so dimensioned in respect of diameter, screw thread pitch and screw thread cross-section that the maximum required flow of material is conveyed, even at low speeds, with minimum harmful frictional heat arising in the medium being conveyed. The drive speed of each of the feed pumps is adjustable.

The plasticizing means may consist of a housing in the interior of which are known rotatable kneading elements such as planetary rollers having a smooth or serrated surface, friction cylinders, friction cones, friction wheels or discs, lugs, screws or other kneading members in the form of a rotor, which are driven by means of a regulatable speed drive. The free flow cross-section between the housing wall and the kneading elements is so dimensioned that the plasticizing energy is provided substantially, solely by the kneading elements and not by uncontrollable frictional work done as the material flows through the plasticizing unit.

The rotatable kneading elements are so disposed that the material fed to them is engaged, conveyed and plasticized uniformly in the axial direction from the inlet to the outlet of the plasticizing means, so that as far as possible each particle of material can flow through the plasticizing means with the same dwell time. The material is preferably supplied and discharged in the axial direction of the elements and deflecting elements are provided if the feeding or compressing means is disposed transversely of the axis of the rotatable kneading elements, such deflecting elements being, for example, baffles, spirals or the like.

To monitor the plasticizing energy available in the plasticizing means (to enable the plasticizing operation to be controlled) one or more temperature measuring points are disposed on the unit housing or in its interior. The temperature occurring in the plasticizing means is the basis for controlling or regulating the process. By adapting the speed of the feeding means to the speed of the compressing means, it is possible (irrespective of the throughput at any time) to regulate the pressure in the material in the plasticizing means to a given value. This pressure can be accurately determined by way of differential regulation principle. Since the total throughput from the inlet to the outlet of the apparatus is logically identical in the three zones for any given state to which the apparatus has been set, there is a higher pressure in the middle region, i.e., in the plasticizing means, when the feeding means is set to a higher conveying value and when the compressing means is set to a lower conveying value. The opposite adjustment produces a pressure reduction in the plasticizing means. A very fine adjustment can be obtained by means of the slight flowback, effects occurring at the screw pumps used in the feeding and compressing means.

Depending upon the material being processed, the pressure adjustment may be carried out either by adjusting the feeding means or by adjusting the compressing means.

An excessively high pressure in the plasticizing means is indicated by an excessive temperature (excessive frictional heat) and an inadequate pressure is indicated by too low a temperature (inadequate frictional heat).

The advantage of this regulating method is that it permits the elimination of the cooling methods generally required in the prior-art processes and apparatus, for dissipating excess harmful heat. Although the apparatus has a temperature control, temperature control from the outside is effected solely when the apparatus is to be brought to operating temperature prior to starting, or when a short change-over of the temperature program is necessary.

The adjustment of the plasticizing pressure or plasticizing temperature via conveying speed regulation in the upstream or downstream means may be carried out manually or automatically for example by way of automatic control gear assembly.

Preferably, the screw pumps of the feeding and compressing means are each arranged with two screws rotating in opposite directions, their drive shafts diverging towards the drive end in order to create space for adequately dimensioned drive elements. Since they act solely as a conveyor and compressor, the screws have only the number of screw threads required for reciprocal blocking overlapping of the screw threads at the filling point. The screw lengths are therefore very short and a slight conicity of the outer lands of the threads gives sufficient space for the heavily stressed drive elements of the transmission with a relatively small torsion-resistant shaft length.

The short length and slight conicity of the screws also enables the screw threads to be constructed without any compression thereof, unlike known conical screws with divergent axes. This means that the screw threads may be given a volume cross-section which does not decrease in the direction of conveyance. The screws can without difficulty be produced with a constant cross-section which preferably widens out in the direction of flow. A narrowing cross-section would increase the conveying friction from the required low value.

BRIEF DESCRIPTION OF THE DRAWINGS

An embodiment of the present invention will now be described, by way of example only, with reference to the accompanying drawing, in which.

DESCRIPTION OF THE PREFERRED EMBODIMENT

Figures 1, 2:
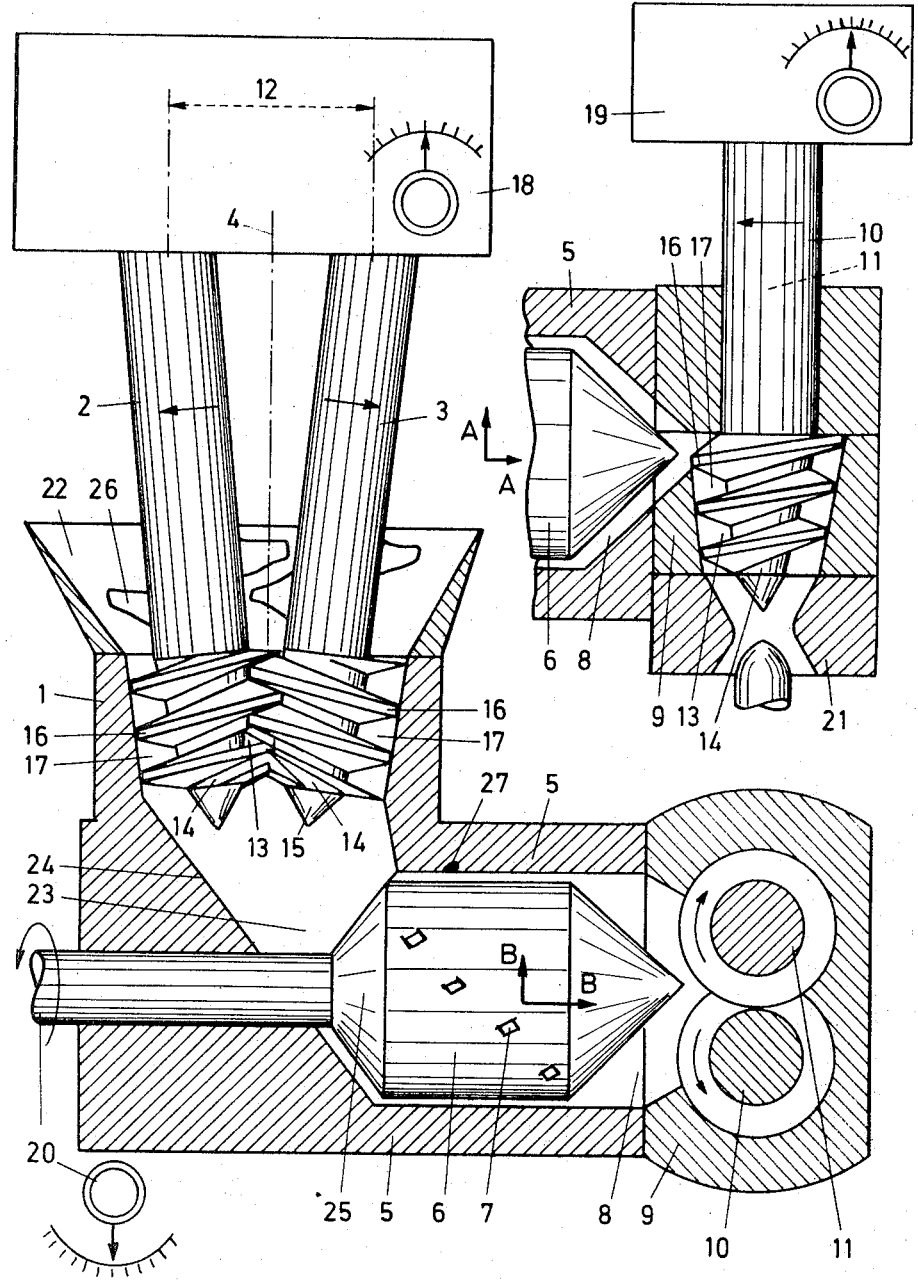
FIG. 1 is a longitudinal section through apparatus according to the invention and is a partial cross-section on the line A—A of FIG. 2.
FIG. 2 is a partial cross-section on the line B—B of FIG. 1.

FIG. 1 shows a feeding means 1 in the form of a screw pump comprising two divergent screws 2 and 3 which are rotated in opposite directions and shown offset by 90° on the centre-line 4 for the sake of clarity.

A rotor 6 provided with kneading lugs 7 forms the plasticizing element in the plasticizing means 5 of the apparatus.

At the outlet 8 of the plasticizing means 5, the compressing means 9 is provided in the form of a screw pump having two screws 10 and 11 rotatable in opposite directions.

FIG. 1 shows the between-centres distance 12 of the axis of the divergent screws 2 and 3. The screws 10 and 11 of the compressing means 9 have the same between-centres distance.

The screws 2, 3, 10 and 11 are each shown with three screw threads 13. The threaded cores 14 taper conically towards the tip 15 of the screw more than the outer lands 16. The screw thread cross-section 17 thus formed has a dimension which does not decrease in the direction of flow, and it may preferably be provided with an increasing size.

The feeding means 1 is driven via a variable transmission 18, the compressing means 9 is driven via a variable transmission 19, and the rotor 6 is driven via a variable transmission 20.

The increased between-centres distance 12 between the screws 2 and 3, and 10 and 11, due to their divergence provides an increased area available for accommodating the heavy drive transmission elements required.

FIG. 2 shows at the outlet of the compressing means a forming nozzle 21 for extruding a hollow member.

The raw material which is to be processed is fed to a feed hopper 22 at the inlet to the feeding means 1 and fed by the feeding means through chamber 23 where the flow of material is deflected by an inclined wall 24 and by the conical end face 25 of the rotor 6, into the plasticizing means 5, where it is plasticized. The plasticized material is then fed from the outlet 8 of the plasticizing means 5 to the compressing means 9, which forces it through the forming nozzle 21.

Depending upon the nature of the product, pre-compaction or de-compaction tools, for example agitator arms, lugs or screws 26, may be provided in the feed hopper 22 and in some cases may result in a better drawing-off of the material by the feeding means 1. These tools may be fitted directly onto the spindles of the screws 2 and 3, although they may have their own independent drive means.

A temperature measuring sensor or point 27 is shown in the plasticizing section 5.

The relative arrangement of the feeding, plasticizing and compressing means, with respect to one another, may be different from that shown. For example, the individual means may be disposed either together or separately on a common axis.

It may be sufficient in some cases for just one or two of the three means to have a separately variable drive to bring the plasticizing pressure to a given value. However, a pressure control should be available for the plasticizing means by variation of conveying speeds between the plasticizing means and one or both of the preceding feeding and following compressing means.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by letters Patent is:

I claim:

1. Apparatus for treating thermoplastic material, comprising
   a. means operating feeding means to feed material to be processed,
   b. means for plasticizing the material by utilizing frictional heat evolved by kneading the material,
   c. means withdrawing and compressing the plasicized material by operating a compressing means, and
   d. means monitoring the temperature of the material in said plasticizing means and controlling the temperature by regulating the pressure in the material in said plasticizing means by varying the speed at which material is conveyed between said plasticizing means and at least one of the said feeding means and said compressing means, the said feeding and conveying means being operated with low friction.

2. Apparatus as recited in claim 1, wherein the means for plasticizing is supplied with material by the feeding means and utilizes frictional work to plasticize the material fed thereto, wherein the compressing means withdraws and compresses material from the said plasticizing means, wherein said feeding means, said plasticizing means and said compressing means are independently controllable, and wherein the said feeding and compressing means are adapted to be operable with low friction.

3. Apparatus as recited in claim 2, wherein said plasticizing means has a passage with a cross-sectional area of such size and shape that the plasticizing energy is provided substantially solely by movement of kneading tools thereof independently of resistances to flow of material therethrough.

4. Apparatus as recited in claim 2, wherein a plasticizing pressure monitoring means is provided in said plasticizing means.

5. Apparatus as recited in claim 4, wherein the pressure monitoring means is a temperature sensor.

6. Apparatus as recited in claim 2, wherein said feeding means and said compressing means each include a multiple screw pump.

7. Apparatus as recited in claim 6, wherein the screws of each pump are disposed with their axes diverging towards the drive end thereof and have a screw thread conveying cross-section which is constant or increasing in the conveying direction.

8. Apparatus as recited in claim 7, wherein the screw thread conveying cross-section of each pump is so dimensioned that wall frictional heat on the conveyed medium is insignificant.

9. Apparatus as recited in claim 3, wherein the plasticizing means includes a kneading tool in the form of a planetary roller unit.

* * * * *